United States Patent
Kundu et al.

(10) Patent No.: US 9,378,314 B2
(45) Date of Patent: Jun. 28, 2016

(54) ANALYTICAL MODEL FOR PREDICTING CURRENT MISMATCH IN METAL OXIDE SEMICONDUCTOR ARRAYS

(71) Applicant: Taiwan Semiconductor Manufacturing Co., Ltd., Hsin-Chu (TW)

(72) Inventors: Amit Kundu, Hsinchu (TW); Jaw-Juinn Horng, Hsinchu (TW); Yung-Chow Peng, Hsinchu (TW); Shih-Cheng Yang, Zhubei (TW); Chung-Kai Lin, Taipei (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 14/467,327

(22) Filed: Aug. 25, 2014

(65) Prior Publication Data

US 2014/0372959 A1    Dec. 18, 2014

Related U.S. Application Data

(63) Continuation of application No. 13/751,195, filed on Jan. 28, 2013, now Pat. No. 8,832,619.

(51) Int. Cl.
*G06F 17/50* (2006.01)
*H01L 27/02* (2006.01)

(52) U.S. Cl.
CPC ........ *G06F 17/5036* (2013.01); *G06F 17/5072* (2013.01); *G06F 2217/10* (2013.01); *G06F 2217/78* (2013.01); *H01L 27/0207* (2013.01)

(58) Field of Classification Search
CPC .. H01L 27/0207; G11C 11/417; G11C 5/025; G06F 17/5036; G06F 2217/10; G06F 2217/78; G06F 17/5072; F24J 2/12; G05F 3/262

USPC ............... 716/51, 54, 106, 111, 132, 136
See application file for complete search history.

(56) References Cited

U.S. PATENT DOCUMENTS

| | | | | |
|---|---|---|---|---|
| 4,636,983 A | * | 1/1987 | Young ................. | G11C 7/12 365/181 |
| 5,547,893 A | * | 8/1996 | Sung ................. | H01L 21/8249 257/E21.648 |

(Continued)

OTHER PUBLICATIONS

Lim, G.H. et al., "Physics based scalable MOSFET mismatch model for statistical circuit simulation", IEEE Conference on Electron Devices and Solid-State Circuits, EDSSC 2007, pp. 1063-1066.

(Continued)

*Primary Examiner* — Helen Rossoshek
(74) *Attorney, Agent, or Firm* — Duane Morris LLP; Steven E. Koffs

(57) ABSTRACT

A system and method for designing integrated circuits and predicting current mismatch in a metal oxide semiconductor (MOS) array. A first subset of cells in the MOS array is selected and current measured for each of these cells. Standard deviation of current for each cell in the first subset of cells is determined with respect to current of a reference cell. Standard deviation of local variation can be determined using the determined standard deviation of current for one or more cells in the first subset. Standard deviations of variation induced by, for example, poly density gradient effects, in the x and/or y direction of the array can then be determined and current mismatch for any cell in the array determined therefrom.

20 Claims, 5 Drawing Sheets

(56) References Cited

U.S. PATENT DOCUMENTS

| | | | |
|---|---|---|---|
| 5,692,160 A | 11/1997 | Sarin | |
| 5,987,086 A | 11/1999 | Raman et al. | |
| 6,006,024 A | 12/1999 | Guruswamy et al. | |
| 6,028,995 A | 2/2000 | Jetton et al. | |
| 6,107,108 A | 8/2000 | Chen et al. | |
| 6,107,134 A * | 8/2000 | Lu | H01L 27/105 257/E21.645 |
| 6,209,123 B1 | 3/2001 | Maziasz et al. | |
| 6,218,286 B1 | 4/2001 | Su et al. | |
| 6,703,660 B2 | 3/2004 | Yitzchaik et al. | |
| 6,876,208 B2 * | 4/2005 | Kunikiyo | H01L 21/823807 257/48 |
| 6,978,229 B1 | 12/2005 | Saxena et al. | |
| 7,086,020 B2 * | 8/2006 | Chen | G06F 17/5068 716/115 |
| 7,142,043 B2 | 11/2006 | Chou | |
| 7,171,346 B1 | 1/2007 | Recker et al. | |
| 7,216,320 B2 | 5/2007 | Chang et al. | |
| 7,360,191 B2 | 4/2008 | Chang et al. | |
| 7,506,282 B2 | 3/2009 | Adams et al. | |
| 7,549,136 B2 | 6/2009 | Tiwari | |
| 7,586,322 B1 | 9/2009 | Xu et al. | |
| 7,673,260 B2 | 3/2010 | Chen et al. | |
| 7,761,823 B2 | 7/2010 | Goo et al. | |
| 7,802,218 B2 | 9/2010 | Inoue et al. | |
| 7,848,166 B2 | 12/2010 | Hsu et al. | |
| 7,933,153 B2 * | 4/2011 | Furnemont | G11C 16/0475 365/184 |
| 7,936,589 B2 | 5/2011 | Houston | |
| 7,979,832 B2 * | 7/2011 | Jung | G06F 17/5036 716/100 |
| 8,122,423 B2 | 2/2012 | Zjajo et al. | |
| 8,214,169 B2 | 7/2012 | Bhavnagarwala et al. | |
| 8,219,961 B2 | 7/2012 | Moroz et al. | |
| 8,225,248 B2 | 7/2012 | Chen et al. | |
| 8,230,375 B2 | 7/2012 | Madurawe | |
| 8,275,584 B2 | 9/2012 | Lin et al. | |
| 8,302,047 B2 | 10/2012 | Buss et al. | |
| 8,332,794 B2 | 12/2012 | Law et al. | |
| 8,390,536 B2 * | 3/2013 | Troccoli | G09G 3/3233 313/498 |
| 8,508,289 B2 * | 8/2013 | Mazure | H01L 21/84 257/365 |
| 8,549,453 B2 | 10/2013 | Peng et al. | |
| 8,555,236 B2 | 10/2013 | Potkonjak | |
| 8,578,319 B2 | 11/2013 | Papanikolaou et al. | |
| 8,581,760 B2 * | 11/2013 | Muhammad | H03M 1/201 323/213 |
| 8,589,847 B2 | 11/2013 | Law et al. | |
| 8,701,055 B1 | 4/2014 | Lee et al. | |
| 8,759,163 B2 * | 6/2014 | Peng | G06F 17/5072 257/499 |
| 8,978,000 B2 * | 3/2015 | Huang et al. | G06F 17/5068 716/111 |
| 2005/0045821 A1 * | 3/2005 | Noji | G01N 23/225 250/311 |
| 2007/0234253 A1 | 10/2007 | Soreff et al. | |
| 2007/0244676 A1 | 10/2007 | Shang et al. | |
| 2011/0074498 A1 * | 3/2011 | Thompson | H01L 21/823412 327/543 |
| 2011/0178778 A1 | 7/2011 | Tsai et al. | |
| 2011/0215420 A1 | 9/2011 | Hsueh et al. | |
| 2012/0123745 A1 | 5/2012 | Sheu et al. | |
| 2013/0043923 A1 | 2/2013 | Gasper et al. | |
| 2013/0227510 A1 | 8/2013 | Katz et al. | |
| 2013/0285190 A1 | 10/2013 | Peng et al. | |
| 2013/0326111 A1 * | 12/2013 | Arsovski | G11C 15/04 711/102 |
| 2014/0103494 A1 | 4/2014 | Peng et al. | |
| 2014/0189625 A1 * | 7/2014 | Huang | G06F 17/5068 716/111 |

OTHER PUBLICATIONS

Agarwal, K. et al., "Fast Characterization of Threshold Voltage Fluctuation in MOS Devices", IEEE Transactions on Semiconductor Manufacturing, Nov. 2008, 21(4):526-533.

Agarwal, K. et al., "Characterizing Process Variation in Nanometer CMOS", 44th ACM/IEEE Design Automation Conference, DAC 2007, pp. 396-399.

Kuhn, K.J. et al., "Process Technology Variation", IEEE Transactions on Electron Devices, Aug. 2011, 58(8):2197-2208.

Mezzomo, C.M. et al, "Characterization and Modeling of Transistor Variability in Advanced CMOS Technologies", IEEE Transactions on Electron Devices, Aug. 2011, 58(8):2235-2248.

Felt, E. et al., "Measurement and Modeling of MOS Transistor Current Mismatch in Analog IC's", IEEE/ACM International Conference on Computer-Aided Design, 1994, pp. 272-277.

Zhang, et al.,"Effect of current density and geometry structure on Pb-free solder joints electromigration", 2004, AGEC, Proceedings of 2004 International IEEE Conference on the Asian Green Electronics, pp. 77-80.

Kovac, et al.,"Compact model extraction from quantum corrected statistical Monte Carlo simulation of random dopant induced drain current variability", 2010, 8th International Conference on Advanced Semiconductor Devices & Microsystems (ASDAM), pp. 317-320.

Lo Conte et al., "Global Modeling Strategy of Parasitic Coupled Currents Induced by Minority-Carrier Propagation in Semiconductor Substrates", 2010, IEEE Transactions on Electron Devices, 57(1):263-272.

\* cited by examiner

| STDEV | C1 | C2 | C3 | C4 | C5 | C6 | C7 | C8 |
|---|---|---|---|---|---|---|---|---|
| R1 | | | | 3.79 | 3.59 | | | |
| R2 | 1.99 | 1.71 | 2.61 | 2.26 | | | | |
| R3 | 2.02 | 2.19 | 2.17 | | | | | |
| R4 | 5.52 | | | 0.00 | 1.08 | 1.90 | 2.37 | 5.33 |
| R5 | 5.73 | | | 1.27 | 0.78 | 1.88 | 2.41 | 5.31 |
| R6 | | | | 1.74 | 1.43 | | | |
| R7 | | | | 2.13 | 2.02 | | | |
| R8 | | | | 4.52 | 4.64 | | | |

Fig. 2

| STDEV | C1 | C2 | C3 | C4 | C5 | C6 | C7 | C8 |
|---|---|---|---|---|---|---|---|---|
| R1 | | Block1 | | 3.79 | 3.59 | | Block2 | |
| R2 | 1.99 | 1.71 | 2.61 | 2.26 | | | | |
| R3 | 2.02 | 2.19 | 2.17 | | | | | |
| R4 | 5.52 | | | 0.00 | 1.08 | 1.90 | 2.37 | 5.33 |
| R5 | 5.73 | | | 1.27 | 0.78 | 1.88 | 2.41 | 5.31 |
| R6 | | | | 1.74 | 1.43 | | | |
| R7 | | Block3 | | 2.13 | 2.02 | | Block4 | |
| R8 | | | | 4.52 | 4.64 | | | |

Fig. 3

ANALYTICAL MODEL FOR PREDICTING CURRENT MISMATCH IN METAL OXIDE SEMICONDUCTOR ARRAYS

This application is a continuation of U.S. patent application Ser. No. 13/751,195, filed Jan. 28, 2013, which is expressly incorporated by reference herein in its entirety.

BACKGROUND

Complementary metal oxide semiconductor (CMOS) transistors are the building blocks for integrated circuits (ICs). CMOS devices continue to be scaled to smaller sizes with the goals of increasing both device speed and IC density. Exemplary CMOS devices include N-type metal oxide semiconductor (NMOS) and P-type metal oxide semiconductor (PMOS) transistors. A CMOS transistor generally comprises a semiconductor substrate, a channel layer above the semiconductor substrate, a gate oxide layer and a gate stack above the channel layer, and source and drain diffusion regions in the surface of the semiconductor substrate.

A good understanding of the matching behavior of components available in a particular IC technology is critical in designing ICs. With the advancements in technology leading to smaller feature sizes and more stringent design constraints, device mismatch considerations are becoming increasingly important. Thus, as semiconductor feature size decreases, statistical variations in circuitry characteristics, caused by statistical variations in semiconductor processes can become increasingly severe. An accurate model of current mismatch is an integral part of any computer aided design (CAD) environment as it enables a designer to make high-level design trade-offs, such as area of transistor versus current mismatch, etc., at an early stage of a design cycle. Such models also allow the designer to accurately predict circuit yield and/or improve that yield.

Current mismatch in a certain component can generally be defined as a variation in the value of identically designed components. Some of the causes of current mismatch are edge effects, implantation and surface state charges, oxide effects, mobility effects, poly density gradient effects, etc. Even though the importance of current matching is widely recognized in the industry there remains a need to provide a tool or model based on silicon to predict the impact of poly density gradient effects on MOS arrays

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features can be arbitrarily increased or reduced for clarity of discussion.

FIG. 2 is an illustration of the array of FIG. 1 providing standard deviations for certain rows and columns of cells in the array.

FIG. 3 is an illustration of an array having non-uniform poly density gradient effects.

DETAILED DESCRIPTION

Figure 1:
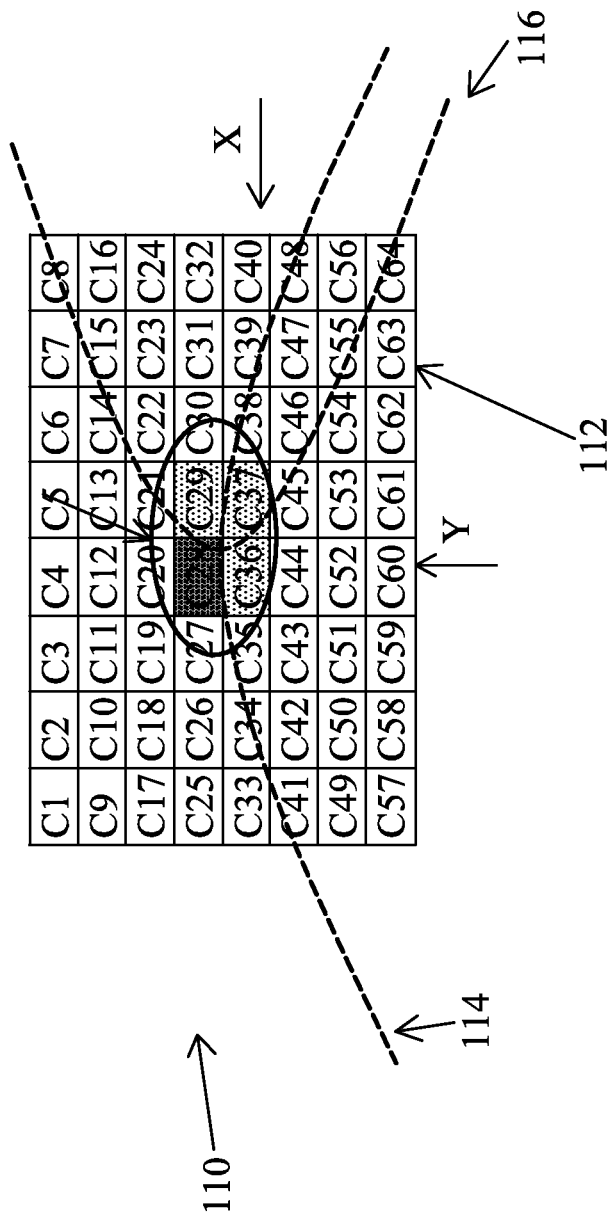
FIG. 1 is an illustration of an exemplary metal oxide semiconductor array having sixty four cells.

It is understood that the following disclosure provides many different embodiments or examples for implementing different features of various embodiments. Specific examples of components and arrangements are described below to simplify the present disclosure. These are, of course, merely examples and are not intended to be limiting. The present disclosure may repeat reference numerals and/or letters in the various examples. This repetition is for the purpose of simplicity and clarity and does not in itself dictate a relationship between the various embodiments and/or configurations discussed.

Terms used herein are only used to describe the specific embodiments, which are not used to limit the claims appended herewith. For example, unless limited otherwise, the term "one" or "the" of the single form may also represent the plural form. The terms such as "first" and "second" are used for describing various devices, areas and layers, etc., though such terms are only used for distinguishing one device, one area or one layer from another device, another area or another layer. Therefore, the first area can also be referred to as the second area without departing from the spirit of the claimed subject matter, and the others are deduced by analogy. Moreover, space orientation terms such as "under", "on", "up", "down", etc. are used to describe a relationship between a device or a characteristic and another device or another characteristic in the drawing. It should be noted that the space orientation term can cover different orientations of the device besides the orientation of the device illustrated in the drawing.

Various embodiments of the present disclosure provide an analytical tool to predict current mismatch of cells in a metal oxide semiconductor (MOS) array due to poly density gradient or other similar effects. For example, some embodiments provide a method to predict the impact of poly density gradient effects on a large MOS array resulting in an acceptable first order approximation of variations in the array. Other embodiments of the present disclosure provide a modeling method that requires a reduced silicon area for characterization and/or measurement points in an exemplary array.

It generally is impractical to prototype ICs before the manufacture thereof. Further, the high costs of photolithographic masks and other manufacturing prerequisites make it essential to design an IC to be as close to perfect as possible before the IC is built. Simulations of an IC with a Simulation Program with Integrated Circuit Emphasis (SPICE) is a conventional methodology to verify circuit operation at the transistor level before committing to manufacturing an IC. Certain MOS technology nodes, however, are subject to a number of variation effects. For example, 45 nm technology (N45) is subject to random dopant fluctuation effects, line-edge and line width roughness, variations in the gate dielectric, patterning proximity effects, variations associated with poly grains, and the like. 28 nm technology (N28) and 20 nm technology (N20) are also subject to a number of variation effects including the influence of surrounding poly density gradient effects on device behavior. Conventional SPICE methodologies, however, do not accurately predict the effect of certain component variations of IC performance including, but not limited to, these poly density gradient effects. For example, poly density gradients in adjacent regions (e.g., cells) of an array can cause unequal chemical mechanical planarization or polishing (CMP) polish rates on respective metal gates in the array or have non-uniform rapid thermal annealing (RTA). This, in turn, can influence device properties such as, but not limited to, device mobility and threshold voltage.

Through empirical analysis, it has been observed that cells in a large MOS array exhibit different variation behaviors when compared to the reference cell thereby affecting the linearity performance of typical analog circuits, e.g., current steering digital-to-analog converter (DAC). For example, based upon analyses of silicon data, poly density gradient effects contribute significantly to current mismatch at the corners of an array in a continuous and declining function as it relates to the interior sections thereof.

Using such a relationship, it was found that variation of a cell in an exemplary array can thus be represented by the following relationship:

$$\sigma^2 \sim \sigma_L^2 + \sigma_{x\_po.dn}^2 + \sigma_{y\_po.dn}^2 \quad (1)$$

where $\sigma_L$ represents the standard deviation of a local variation defined by SPICE models caused by random dopant fluctuation in channels and halo implants, work function variations due to grain orientation, process variation effects, etc., and where $\sigma_{x\_po.dn}^2 + \sigma_{y\_po.dn}^2$ represents the variation induced due to poly density gradient effects in the x and y directions.

FIG. 1 is an illustration of an exemplary MOS array 110 having sixty four cells 112. FIG. 2 is an illustration of the MOS array of FIG. 1 providing standard deviations for certain rows and columns of cells in the array. With reference to FIG. 1, the MOS array 110 is an eight-by-eight array having sixty four cells 112 with cell numbers C1 to C64. Any of the center cells, C28, C29, C36 and C37 can be reference cells; however, in the depicted embodiment, cell C28 provides reference input current for the array. Of course, embodiments of the present disclosure should not be so limited as larger or smaller arrays can be appropriately modeled. For example, in other embodiments of the present disclosure a 100 μm×100 μm array or a 300 μm by 300 μm array, to name a few, can be appropriately modeled. Through empirical analysis, it was observed that the poly density gradient effect has a profound effect on silicon data. For example, selecting the fourth row starting from cell C25, it was observed that the variations caused by poly density gradient effects in the X-direction, i.e., from cell C25 to C26 to C27, gradually decreases as illustrated in FIG. 2. The same was also observed for the Y-direction, i.e., from, for example, cell C60 to C52 to C44. These variations in standard deviation from the reference current cell C28 can be modeled as a continuous function as illustratively depicted by the parabolas 114, 116 in FIG. 1. It should be noted that, in some embodiments of the present disclosure, for cells specifically in the measured rows (C25, C33, . . . , C32, C40) and columns (C4, C5, . . . , C60, C61) (i.e., central rows and columns of the array), the effect of only one variation, either due to the X-poly density gradient or the Y-poly density gradient is observed. For example, it was observed in rows R4 and R5 that there is no poly density gradient effect due to the Y-direction, and for columns C4 and C5, no poly density gradient effect was observed due to the X-direction.

As analysis of silicon data has illustrated a declining and continuous function from the edge of the array to the center for the poly density gradient in both the X-direction and Y-direction, distribution of current in a plurality of cell blocks 220 can be expressed as a function of standard deviations measured for the cells in rows R4 and R5 and in columns C4 and C5 depicted in FIG. 2. It follows that, based on first order approximations, the difference in mismatch or variation between cell A in R4 and cell B in R5 can be represented as:

$$\sigma_A^2 - \sigma_B^2 \sim \sigma_L^2 \quad (2)$$

resulting in the typically defined local variation $\sigma_L^2$ by SPICE modeling. Accounting for mismatch in current due to poly density gradient effect in the X-direction for column 1 results in the relationship for cell A with respect to the reference cell of:

$$\sigma_A^2 - \sigma_R^2 \sim \sigma_{x1}^2 + \sigma_L^2 \quad (3)$$

Similar relationships can be determined for mismatch in current due to poly density gradient effect in the X-direction for the other columns (e.g., $\sigma_{x2}^2$, $\sigma_{x3}^2$, etc.) and cells in similar fashion, as needed.

Accounting for mismatch in current due to poly density gradient effect in the Y-direction for row 1 results in the relationship for any cell C with respect to the reference cell of:

$$\sigma_C^2 - \sigma_R^2 \sim \sigma_y^2 + \sigma_L^2 \quad (4)$$

Similar relationships can be determined for mismatch in current due to poly density gradient effect in the Y-direction for the other rows (e.g., $\sigma_{y2}^2$, $\sigma_{y3}^2$, etc.) and cells in similar fashion, as needed. Using relationships (1), (2), (3) and (4) above, it follows that the variables representing, for example, $\sigma_{x1}^2$ and $\sigma_{y1}^2$, can be determined using the standard deviations of each cell with regard to the reference cell and the SPICE defined $\sigma_L^2$.

Hence, for cell C1 in FIG. 1 the mismatch or variation between cell C1 and the reference cell can be represented as:

$$\sigma_1^2 - \sigma_R^2 \sim \sigma_L^2 + \sigma_{x1}^2 + \sigma_{y1}^2 \quad (5)$$

and for cell C19 in FIG. 1 the mismatch or variation between cell C19 and reference cell can be represented as:

$$\sigma_{19}^2 - \sigma_R^2 \sim \sigma_L^2 + \sigma_{x3}^2 + \sigma_{y3}^2 \quad (6)$$

Similar relationships can be determined for current mismatch for each cell in an exemplary array. In various embodiments of the present disclosure, co-variances can be added in the case where the X and Y-direction gradients are correlated. Thus, measurements of current mismatch are not required at each and every point in exemplary arrays. Rather than measuring each and every cell, current can be measured and variations determined for the centrally located cells in the array, e.g., rows 4 and 5 and columns 4 and 5, and mismatch for any cell in the array predicted as a function of these measurements. Thus, exemplary models according to embodiments of the present disclosure can characterize the entire variation of an array using measurements of central rows and columns. Exemplary embodiments of the present disclosure can also reduce the amount of silicon utilized for respective modeling as silicon in only the respective measured columns need be deposited or taped out rather than the entire array.

In various embodiments of the present disclosure, an exemplary method can include measuring the current of each cell in an n×m array of central rows $R_{(n/2)}$ and $R_{(n/2+1)}$ and central columns $C_{(m/2)}$ and $C_{(m/2+1)}$. Of course, additional rows and/or columns (e.g., more than the previously described two central rows and columns) can be measured and such an example should not limit the scope of the claims appended herewith. For example, in larger arrays, more than two central rows and columns can be measured to provide additional accuracy in the modeling of the variation for cells in the respective array. In additional embodiments of the present disclosure, the measurements in adjacent rows and/or columns can be averaged. Subsequent to such measurements, the standard deviation of each cell with respect to a reference cell can be determined. The variation induced due to poly density gradient effects in the x and y directions, $\sigma_{x1}^2, \ldots, \sigma_{xn}^2$ and $\sigma_{y1}^2, \ldots, \sigma_{ym}^2$, should then be determined using these standard deviation values and the local variation defined by SPICE models:

$$\sigma_{(\frac{n}{2}+1)}^2 - \sigma_{(\frac{n}{2})}^2 \sim \sigma_L^2 \qquad (7)$$

$$\sigma_{(\frac{n}{2})}^2 - \sigma_R^2 \sim \sigma_L^2 + \sigma_{x1}^2 \qquad (8)$$

Thus, to obtain the variation for any cell at a position in an n×m array, the following relationship can be employed:

$$\sigma^2 \sim \sigma_{xn}^2 + \sigma_{ym}^2 + \sigma_L^2 \qquad (9)$$

In the event that poly density gradient effects are not uniform in each direction as depicted in FIG. 3, additional embodiments of the present disclosure can determine the variations as described below. With reference to FIG. 3, if designer desires to determine the variation in current mismatch for every element contained in Block 1, then the designer can determine the variations for $\sigma_{x1\_Left}^2$ and $\sigma_{y1\_top}^2$ using the relationships above. Similarly, to determine the variation in current mismatch for every element contained in Block 2, one would determine the variations for $\sigma_{x1\_right}^2$ and $\sigma_{y1\_top}^2$. It follows that current mismatch in Block 1~f ($\sigma_{x\_left}$, $\sigma_{y\_top}$), Block 2~f ($\sigma_{x\_right}$, $\sigma_{y\_top}$), Block 3~f ($\sigma_{x\_left}$, $\sigma_{y\_bot}$), and Block 4~f($\sigma_{x\_right}$, $\sigma_{y\_ot}$). Thus, based upon the position of the block with regard to the measured currents, numerous combinations of variations can be employed to determine current mismatch of cells in an array having non uniform poly density gradient effects.

Embodiments of the present disclosure can thus provide a method of predicting device behaviors for a plurality of cells in an array through an accurate measurement of standard deviations for central rows and columns in the array leading to an approximate reduction in current measurement times of fifty percent. As poly density gradient behavior varies with each technology node (e.g., N16, N20, N28), thorough characterization of this behavior is required for proper analog circuit design. Hence, a reduction in silicon area of approximately forty percent can be encountered when characterizing this effect using this method as only central rows and columns are required to be put on silicon. Furthermore, analytical methods according to embodiments of the present disclosure provide rapid approximations for current mismatch to an analog designer through the quantification of the maximum impact to all elements in an array using relatively few measurements and lower silicon areas. Additional embodiments of the present disclosure can utilize or incorporate the foregoing methodology as a part of a SPICE macro-model.

It is thus an aspect of various embodiments of the present disclosure to provide a method for a designer to predict current mismatch trends in large arrays and provide an analytical model of the impact of poly density gradient effects on such arrays. Exemplary embodiments of the present disclosure can be utilized for large arrays over 100 μm×100 μm and result in a reduction in silicon area by approximately forty percent when compared to conventional techniques. Hence, characterization of poly density impacts for each technology nodes can be simplified and result in a more cost effective and efficient process.

Figure 4:
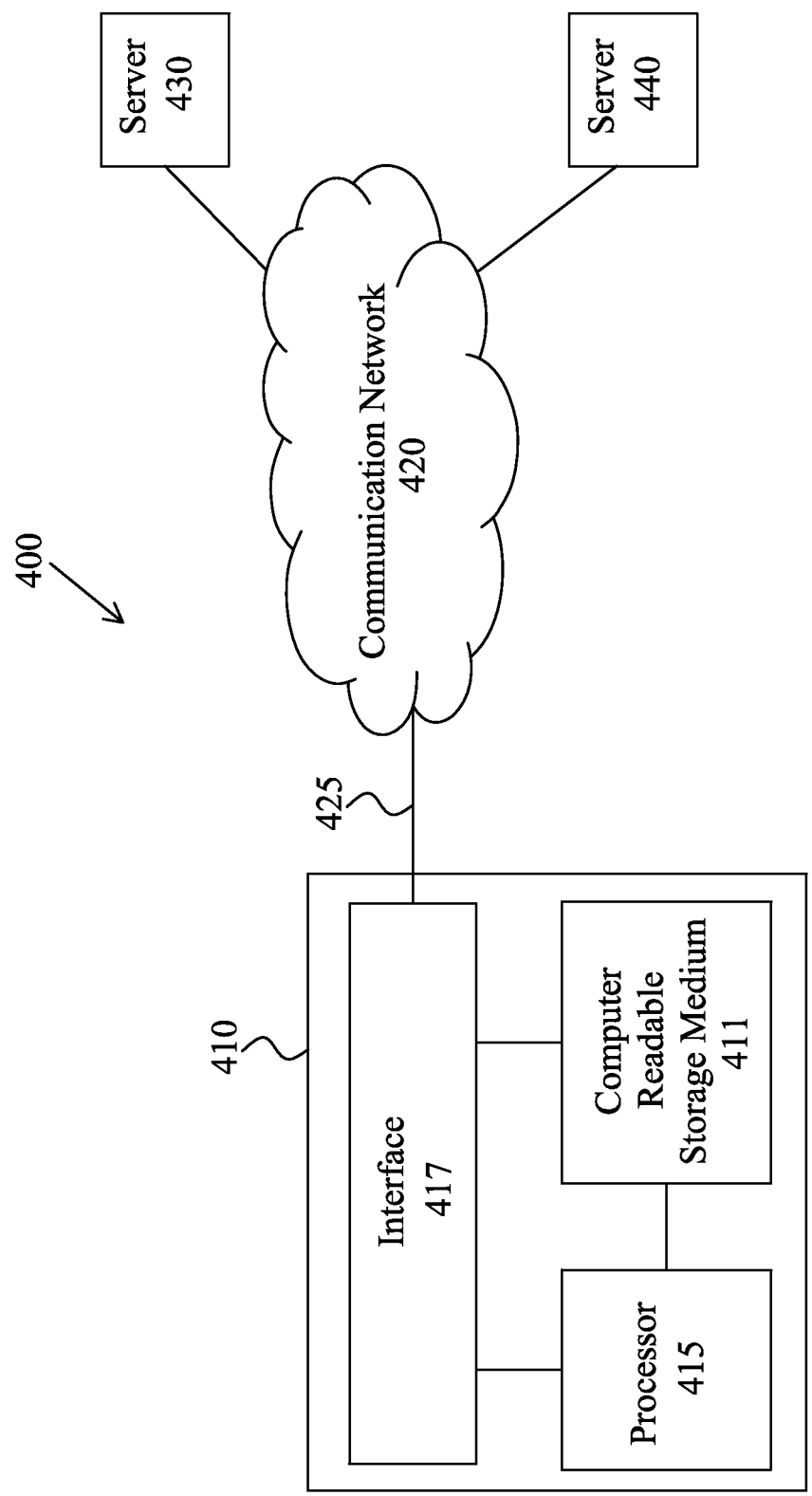
FIG. 4 is a schematic drawing illustrating an exemplary network system.

FIG. 4 is a schematic drawing illustrating an exemplary network system. With reference to FIG. 4, an exemplary network system 400 can include a computer system 410 coupled with servers 430 and 440 through a communication network 420. In some embodiments, the computer system 410 can include a computer readable storage medium 411 encoded with computer program code. The computer system 410 can include a processor 415 electrically coupled with the computer readable storage medium 411. The processor 415 can be configured to execute the computer program code for designing and/or modeling ICs. The processor 415 can be a central processing unit (CPU), a multi-processor, a distributed processing system, and/or any suitable processing unit. In some embodiments, the processor 415 can be configured to perform an analytical model or simulation for predicting current mismatch in a MOS array. The processor 415 can be further configured to generate a design layout of the IC corresponding to a result of the simulation.

In some embodiments, the computer readable storage medium 411 can be an electronic, magnetic, optical, electromagnetic, infrared, a semiconductor system (or apparatus or device), and/or a propagation medium. For example, the computer readable storage medium 411 can include a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 411 can include a compact disk-read only memory (CD-ROM), a compact disk-read/write (CD-R/W), and/or a digital video disc (DVD). In some embodiments, the computer program code stored in the computer readable storage medium 411 can include at least one software and/or circuit related data such as technology files, netlists, electronic design automation (EDA) tools, simulators, and/or any other software or data that are used for designing ICs. In some embodiments, the software can be stored in the servers 430 and 440 and accessed through the communication network 420. For example, the computer system 410 can be electrically coupled with the communications network 420 through a wireless and/or wired link 425. The communication network 420 can be, for example, a complete network, a subset of a local area network, a company-wide intranet, and/or the Internet. The computer system 410 can be identified on the communication network 420 by an address or a combination of addresses, such as a media access control (MAC) address associated with a network interface 417 and an internet protocol (IP) address. The network interface 417 can be, for example, a modem, a wireless transceiver, and/or one or more network interface cards (NICs).

In some embodiments, the computer system 410 includes a computer readable storage medium 411 being encoded with computer program code, and a processor 415 electrically coupled with the computer readable storage medium 411. The processor 415 can be configured to execute the computer program code for predicting current mismatch, characterizing a MOS array, and/or designing an IC and can be arranged to cause the processor 415 to model a selected array or technology node. In some embodiments of the present disclosure, the processor 415 can be configured to select a first subset of cells from a plurality of cells in a MOS array having N rows and M columns of cells and determine standard deviation of measured current for each cell in the first subset of cells with respect to current measured for a reference cell in the array. In various embodiments, the first subset of cells includes the center two rows and two columns of the MOS array. In other embodiments, the first subset of cells includes additional rows and/or columns in addition to the center two rows and columns. The processor 415 can also be configured to determine standard deviation of local variation as a function of the determined standard deviation of current for one or more cells in the first subset, and the processor 415 can be configured to determine standard deviation of variation induced due to a predetermined variation effect in a first direction as a function of the determined standard deviation of local variation and the determined standard deviation of current for one or more cells in the first subset. In some embodiments, the predetermined variation effect is poly density gradient effect and can be substantially uniform or non-uniform in nature over the array. In additional embodiments of the present disclosure, the processor 415 can be configured to determine standard deviation of variation induced due to a predetermined variation effect in a second direction as a function of the determined standard deviation of local variation and the determined standard deviation of current for one or more cells in the first subset. In other embodiments of the present disclosure, the processor 415 is further configured to predict current mismatch in a second subset of cells (e.g., the cells in the areas labeled Block1, Block2, Block3 and/or Block4 in FIG. 3), the second subset comprising one or more cells each mutually exclusive of the first subset of cells. This exemplary system can be used in a SPICE macro-model for the simulation of a MOS array.

Figure 5:
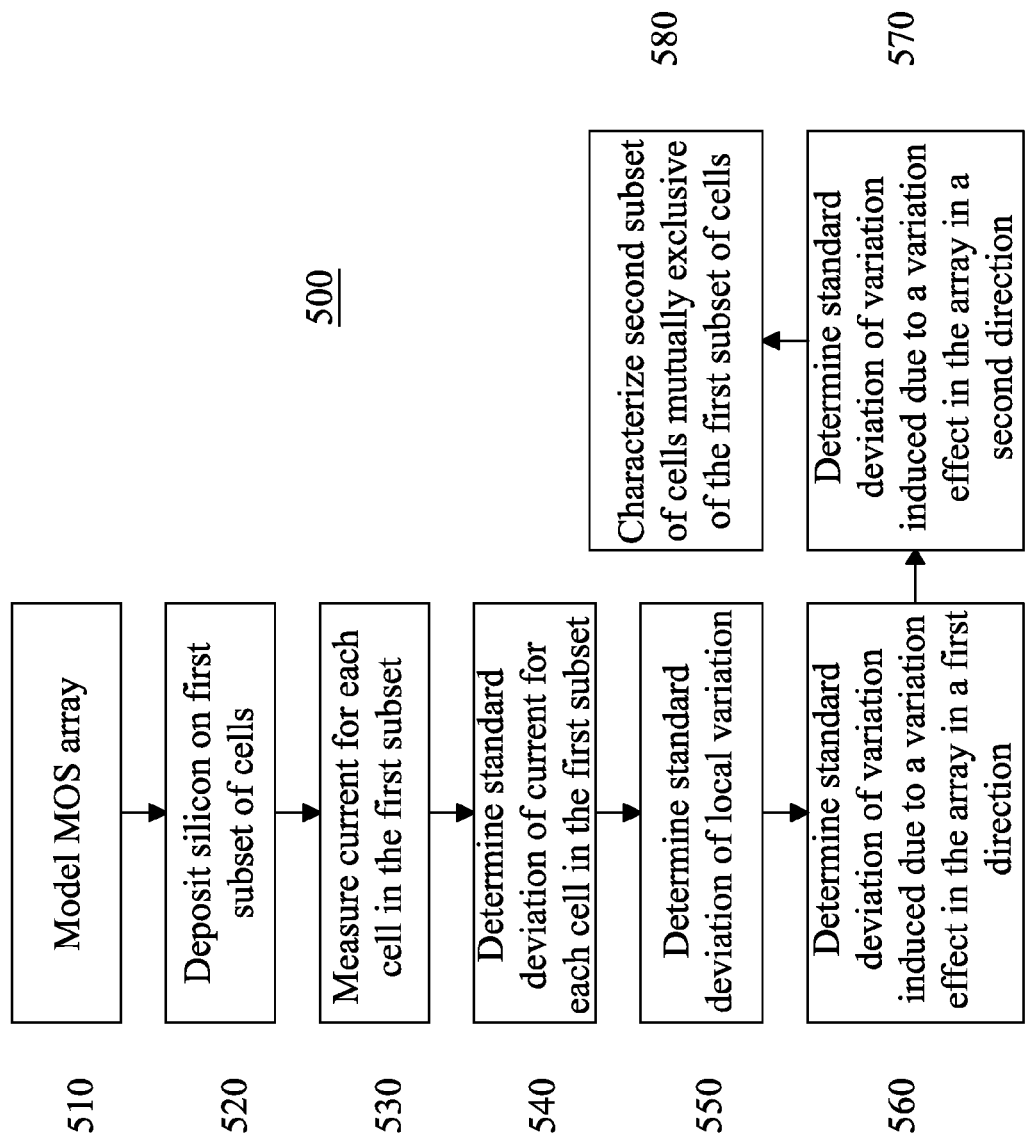
FIG. 5 is a block diagram of some embodiments according to the present disclosure.

FIG. 5 is a block diagram of some embodiments according to the present disclosure. With reference to FIG. 5, a method 500 of designing an IC is provided. The method 500 includes, at step 510, modeling a MOS array having a plurality of rows and columns defining a set of cells. At step 520, depositing silicon on a first subset of cells of the set, and at step 530 current is measured for each cell in the first subset of cells. In some embodiments, the first subset of cells includes the center two rows and two columns of the MOS array. In other embodiments, the first subset of cells includes additional rows and/or columns in addition to the center two rows and columns. At step 540 standard deviation of current for each cell in the first subset of cells is determined with respect to current of a reference cell in the array. Standard deviation of local variation can then be determined as a function of the determined standard deviation of current for one or more cells in the first subset at step 550. At step 560, standard deviation of variation induced due to a predetermined variation effect in a first direction can be determined as a function of the determined standard deviation of local variation and the determined standard deviation of current for one or more cells in the first subset. At step 570, standard deviation of variation induced due to a predetermined variation effect in a second direction can be determined as a function of the determined standard deviation of local variation and the determined standard deviation of current for one or more cells in the first subset. At step 580, a second subset of cells of the set can be characterized as a function of the determined standard deviation of variation induced due to a predetermined variation effect in the first direction and/or second direction, the second subset comprising one or more cells each mutually exclusive of the first subset of cells. In some embodiments, the predetermined variation effect is poly density gradient effect and can be substantially uniform or non-uniform in nature over the array. In various embodiments, the method 500 comprises predicting current mismatch in a second subset of cells of the set whereby the second subset includes one or more cells each mutually exclusive of the first subset of cells. In other embodiments, the method includes averaging the determined standard deviation of current for each cell in the first subset of cells, wherein the standard deviation of variation induced due to a predetermined variation effect in a first direction is determined as a function of this averaged determined standard deviation.

Figure 6:
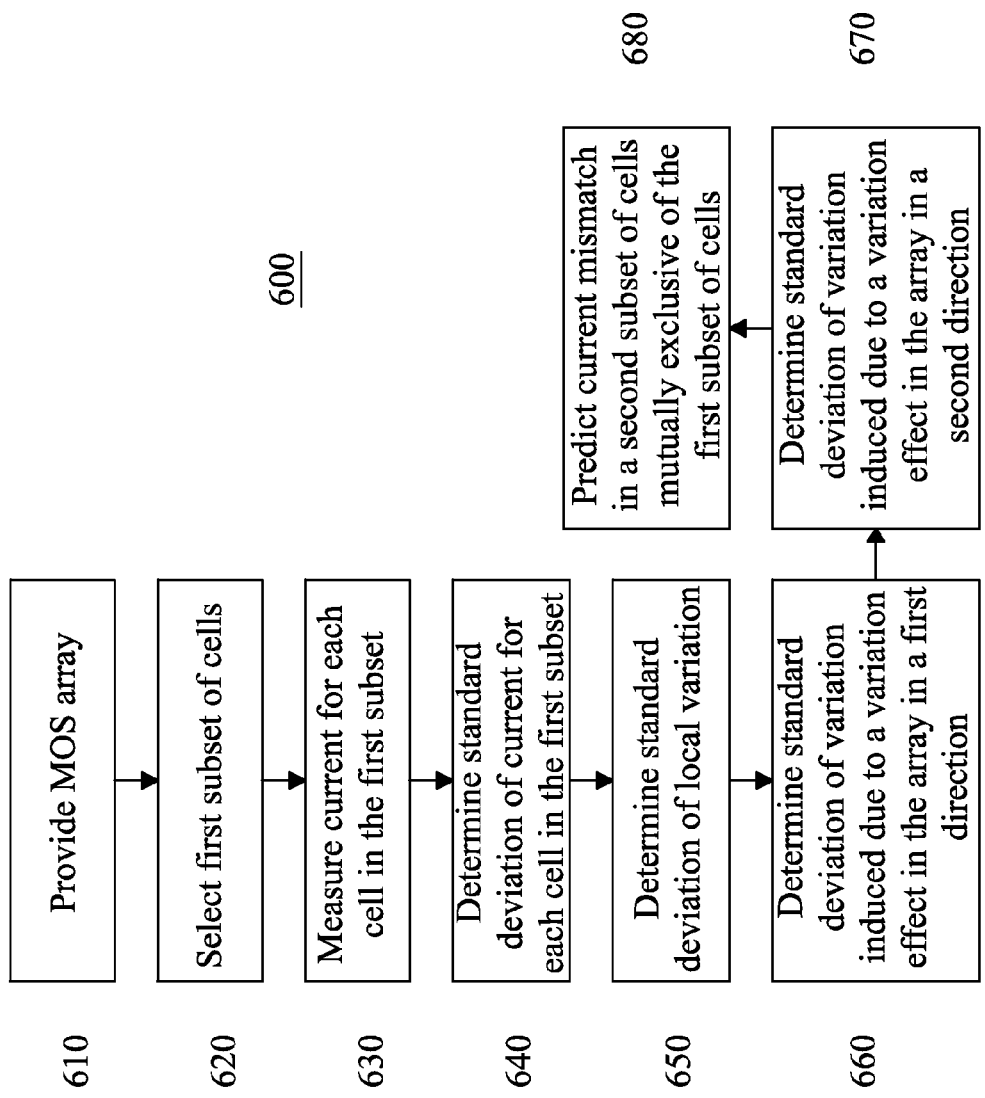
FIG. 6 is a block diagram of various embodiments according to the present disclosure.

FIG. 6 is a block diagram of various embodiments according to the present disclosure. With reference to FIG. 6, a method 600 of predicting current mismatch in a MOS array is provided. The method 600 includes, at step 610, providing a MOS array having a plurality of rows and columns defining a set of cells. At step 620, a first subset of cells of the set can be selected, and at step 630 current is measured for each cell in the first subset of cells. In some embodiments, the first subset of cells includes the center two rows and two columns of the MOS array. In other embodiments, the first subset of cells includes additional rows and/or columns in addition to the center two rows and columns. At step 640 standard deviation of current for each cell in the first subset of cells is determined with respect to current of a reference cell in the array. Standard deviation of local variation can then be determined as a function of the determined standard deviation of current for one or more cells in the first subset at step 650. At step 660, standard deviation of variation induced due to a predetermined variation effect in a first direction can be determined as a function of the determined standard deviation of local variation and the determined standard deviation of current for one or more cells in the first subset. At step 670, standard deviation of variation induced due to a predetermined variation effect in a second direction can be determined as a function of the determined standard deviation of local variation and the determined standard deviation of current for one or more cells in the first subset. In some embodiments, this predetermined variation effect is poly density gradient effect and can be substantially uniform or non-uniform in nature over the array. At step 680, current mismatch can be predicted in a second subset of cells of the set as a function of the determined standard deviation of variation induced due to a predetermined variation effect in a first direction and/or a second direction whereby the second subset includes one or more cells each mutually exclusive of the first subset of cells. In other embodiments, the method includes averaging the determined standard deviation of current for each cell in the first subset of cells, where the standard deviation of variation induced due to a predetermined variation effect in a first direction is determined as a function of this averaged determined standard deviation. Of course, this exemplary method can be used in a SPICE macro-model for the simulation of a MOS array.

Embodiments of the present disclosure and the functional operations described herein can be implemented in digital electronic circuitry, or in computer software, firmware, or hardware, including the structures disclosed in this specification and their structural equivalents, or in combinations of one or more of them. Embodiments of the disclosure described herein can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine-readable storage substrate, a memory device, or a combination of one or more of them.

The term "processor" encompasses all apparatus, devices, and machines for processing data, including by way of example a programmable processor, a computer, or multiple processors or computers. The processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more data memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), to name just a few.

Computer readable media suitable for storing computer program instructions and data include all forms data memory including nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the present disclosure can be implemented on a computer having a display device, e.g., a CRT (cathode ray tube) or LCD (liquid crystal display) monitor, for displaying information to a user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the present disclosure can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the disclosure described herein, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this description may contain many specifics, these should not be construed as limitations on the scope thereof, but rather as descriptions of features that may be specific to particular embodiments. Certain features that have been heretofore described in the context of separate embodiments can also be implemented in combination in a single embodiment. Conversely, various features that are described in the context of a single embodiment can also be implemented in multiple embodiments separately or in any suitable subcombination. Moreover, although features are described above as acting in certain combinations and can even be initially claimed as such, one or more features from a claimed combination can in some cases be excised from the combination, and the claimed combination can be directed to a subcombination or variation of a subcombination.

Similarly, while operations are depicted in the drawings or figures in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

It can be emphasized that the above-described embodiments, particularly any "preferred" embodiments, are merely possible examples of implementations, merely set forth for a clear understanding of the principles of the disclosure. Many variations and modifications can be made to the above-described embodiments of the disclosure without departing substantially from the spirit and principles of the disclosure. All such modifications and variations are intended to be included herein within the scope of this disclosure and the present disclosure and protected by the following claims.

Further, the foregoing has outlined features of several embodiments so that those skilled in the art can better understand the detailed description that follows. Those skilled in the art should appreciate that they can readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they can make various changes, substitutions and alterations herein without departing from the spirit and scope of the present disclosure.

As shown by the various configurations and embodiments illustrated in FIGS. 1-6, various analytical models for predicting current mismatch in metal oxide semiconductor arrays have been described.

While preferred embodiments of the present disclosure have been described, it is to be understood that the embodiments described are illustrative only and that the scope of the invention is to be defined solely by the appended claims when accorded a full range of equivalence, many variations and modifications naturally occurring to those of skill in the art from a perusal hereof.

The invention claimed is:

1. A method of characterizing an array in an IC, comprising the steps of:
    forming an array of cells having a set of cells on a substrate;
    measuring current for each cell in a first subset of the set of cells, the cells in the first subset forming a cross-shape at a center of the array of cells;
    determining a variation of current for each cell in the first subset of cells with respect to current of a reference cell in the array;
    determining local variation of current for one or more cells in the first subset of cells;
    using a processor to calculate variation of current due to a poly density gradient effect in a first direction based on the determined local variation of current and the determined variation of current with respect to the reference cell in the first subset of cells; and
    using the processor to calculate a current mismatch of another cell of the array from the determined local variation and the calculated variation of current due to the poly density gradient effect in the first direction, said another cell being excluded from the first subset of cells.

2. The method of claim 1, further comprising:
    using the processor to calculate variation of current due to a poly density gradient effect in a second direction based on the determined local variation of current and the determined variation of current with respect to the reference cell in the first subset of cells; and
    using the processor to calculate a current mismatch of an additional cell of the array from the determined local variation and the calculated variation of current due to the poly density gradient effects in the first direction and second direction, said additional cell being excluded from the first subset of cells.

3. The method of claim 1, wherein the first subset of cells includes two rows of cells within the array of cells.

4. The method of claim 1, the first subset of cells includes two rows of cells at a center of the array of cells.

5. The method of claim 4, wherein the first subset of cells further includes two columns of cells within the array of cells.

6. The method of claim 4, wherein the first subset of cells further includes two columns of cells at the center of the array of cells.

7. The method of claim 1, wherein the local variation is determined using SPICE modelling.

8. The method of claim 1, wherein the step of using the processor to calculate current mismatch further includes incorporating a covariance between a first direction gradient and a second direction gradient.

9. The method of claim 1, wherein the step of using the processor to calculate current mismatch further includes:
    averaging a standard deviation of current for each cell in the first subset of cells, and
    the step of determining the poly density gradient effect in the first direction determines the poly density gradient in the first direction as a function of the averaged standard deviation.

10. A method of predicting current mismatch in a semiconductor array comprising the steps of:
    providing a semiconductor substrate having a plurality of rows and columns defining a set of cells;
    selecting a first subset of cells of the set, the cells in the first subset forming a cross-shape at a center of the array of cells, the cross-shape extending to edges of the array;
    measuring current for each cell in the first subset of cells;
    determining a local variation of current for one or more cells in the first subset;
    determining variation of current due to a poly density gradient effect in a first direction based on the local variation and the variation of current for one or more cells in the first subset;
    performing computations in a processor to predict current mismatch in a second subset of cells of the set based on the variation of current due to the poly density gradient effect in the first direction, the second subset comprising one or more cells each mutually exclusive of the first subset of cells.

11. The method of claim 10, further comprising:
    using the processor to calculate variation of current due to a poly density gradient effect in a second direction based on the determined local variation of current and the determined variation of current for one or more cells in the first subset; and
    using the processor to calculate a current mismatch of an additional cell of the array from the determined local variation and the calculated variation of current due to the poly density gradient effects in the first direction and second direction, said additional cell being excluded from the first subset of cells.

12. The method of claim 10, the first subset of cells includes two rows of cells at a center of the array of cells.

13. The method of claim 12, wherein the first subset of cells further includes two columns of cells at the center of the array of cells.

14. The method of claim 10, wherein the local variation is determined using SPICE modelling.

15. The method of claim 10, wherein the step of using the processor to calculate current mismatch further includes incorporating a covariance between a first direction gradient and a second direction gradient.

16. A computer system comprising:
    a non-transitory computer readable storage medium encoded with computer program code; and
    a processor configured to execute the computer program code for characterizing an array, such that when the processor executes the code, the processor performs a method comprising:
    selecting a first subset of cells from a plurality of cells in the array, the cells in the first subset forming a cross-shape at a center of the array of cells, the cross-shape extending to edges of the array;
    determining variation of measured current for each cell in the first subset of cells with respect to current measured for a reference cell in the array;
    determining local variation of current for one or more cells in the first subset; and
    determining variation of current due to a poly density gradient effect in a first direction based on the determined local variation and the determined variation of current for one or more cells in the first subset.

17. The system of claim 16 wherein the processor is further configured to determine variation due to the poly density gradient effect in a second direction based on the local variation and the determined variation of current for one or more cells in the first subset.

18. The system of claim 16 wherein the processor is further configured to predict current mismatch in a second subset of cells, the second subset comprising one or more cells each mutually exclusive of the first subset of cells.

19. The system of claim 16 wherein the first subset of cells comprises a union of cells located within the center two rows of the array, and cells located within the center two columns of the array.

20. The system of claim 16, the local variation is determined using SPICE modelling.

* * * * *